United States Patent [19]
Bondurant, III

[11] Patent Number: 5,341,763
[45] Date of Patent: Aug. 30, 1994

[54] REMOVABLE SCREEN FOR ANIMAL LITTER BOX

[76] Inventor: John P. Bondurant, III, 106 Braeburn Dr., Athens, Ga. 30601

[21] Appl. No.: 122,765

[22] Filed: Sep. 16, 1993

[51] Int. Cl.$^5$ .............................................. A01K 29/00
[52] U.S. Cl. ................................................... 119/166
[58] Field of Search ................ 119/161, 165, 166, 168; 209/417

[56] References Cited

U.S. PATENT DOCUMENTS

| | | | |
|---|---|---|---|
| 2,741,223 | 4/1956 | Winborn, Jr. | 119/168 X |
| 2,963,003 | 12/1960 | Oberg et al. | 119/166 |
| 2,971,493 | 2/1961 | Robb | 119/166 |
| 3,141,441 | 7/1964 | Russell . | |
| 3,476,083 | 11/1969 | Vander Wall | 119/166 |
| 3,752,120 | 8/1973 | Pallesi . | |
| 3,990,397 | 11/1976 | Lowe, Jr. | 119/165 |
| 4,190,525 | 2/1980 | Menzel . | |
| 4,359,966 | 11/1982 | Casino . | |
| 4,517,920 | 5/1985 | Yamamoto | 119/166 |
| 4,802,442 | 2/1989 | Wilson . | |
| 4,817,560 | 4/1989 | Prince . | |

FOREIGN PATENT DOCUMENTS

2625957 12/1977 Fed. Rep. of Germany ...... 119/161

Primary Examiner—Thomas Price
Attorney, Agent, or Firm—Jones & Askew

[57] ABSTRACT

A litter screen for use with an animal litter box, for removing solid waste products from the litter box. The litter screen has a hollow body of circular cross-section, open at an upper end and having a perforate screen element at a lower end. A plane spiral coil forms the screen element in the preferred embodiment. The litter screen is lifted from the litter box for removing solid waste products, and then is returned to the litter box by pressing the bottom of the litter screen against litter in the box while thrusting the litter screen downwardly and simultaneously oscillating the litter screen so that the lower end moves downwardly through the litter.

5 Claims, 2 Drawing Sheets

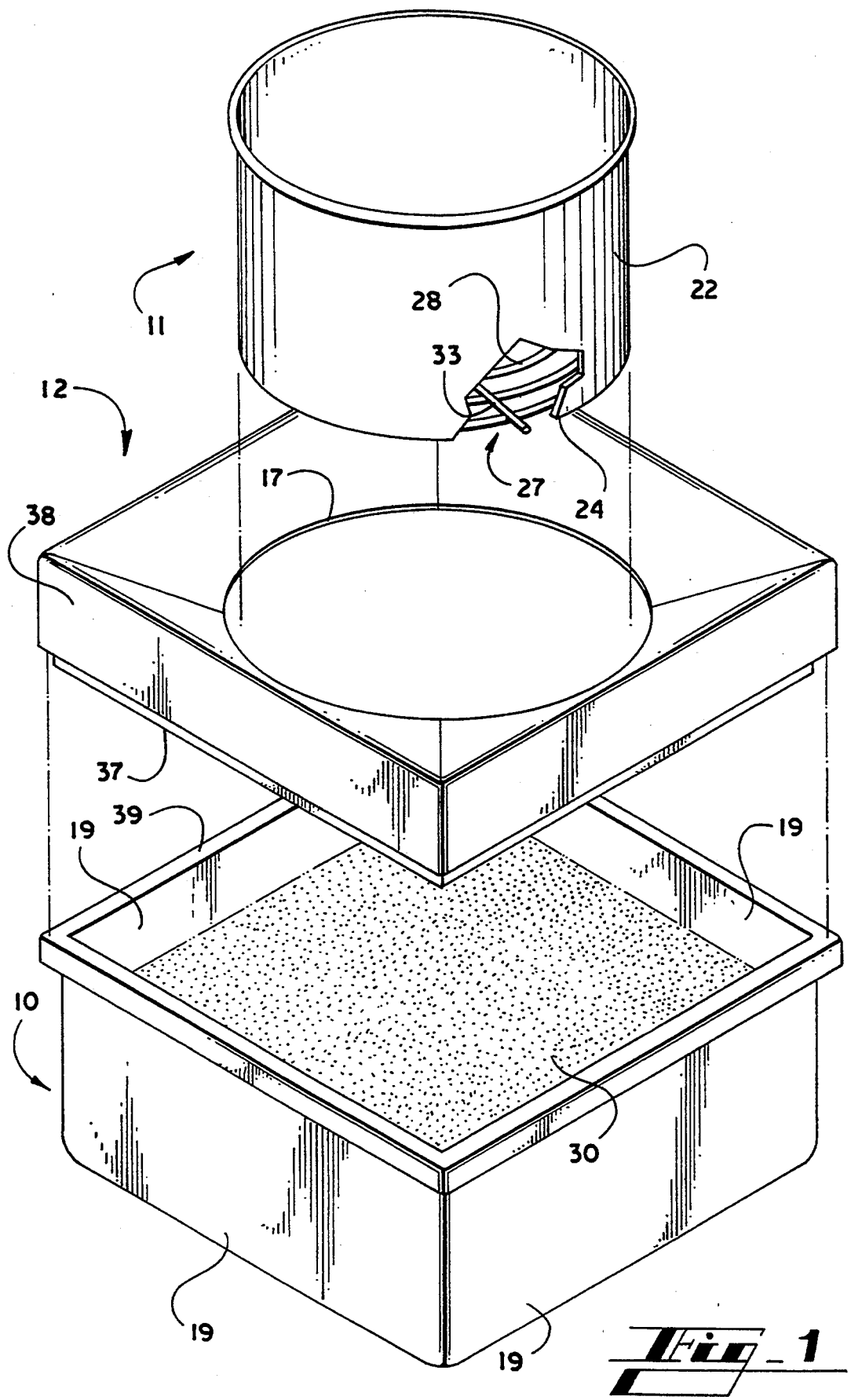
Fig_1

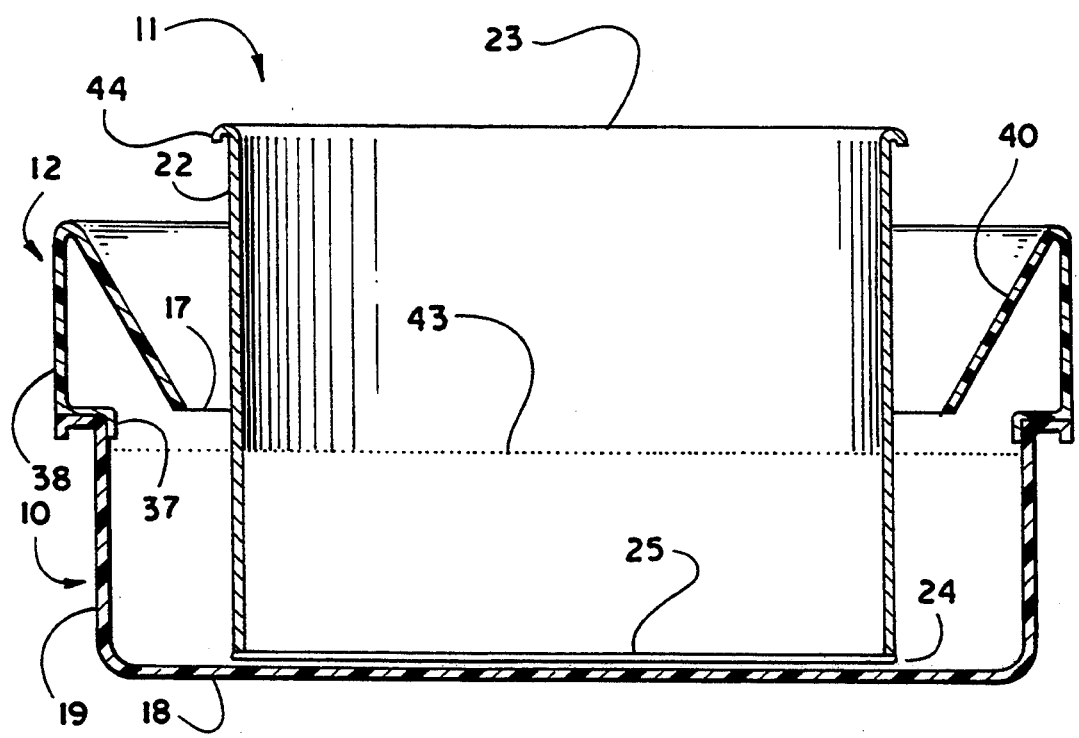
Fig_2
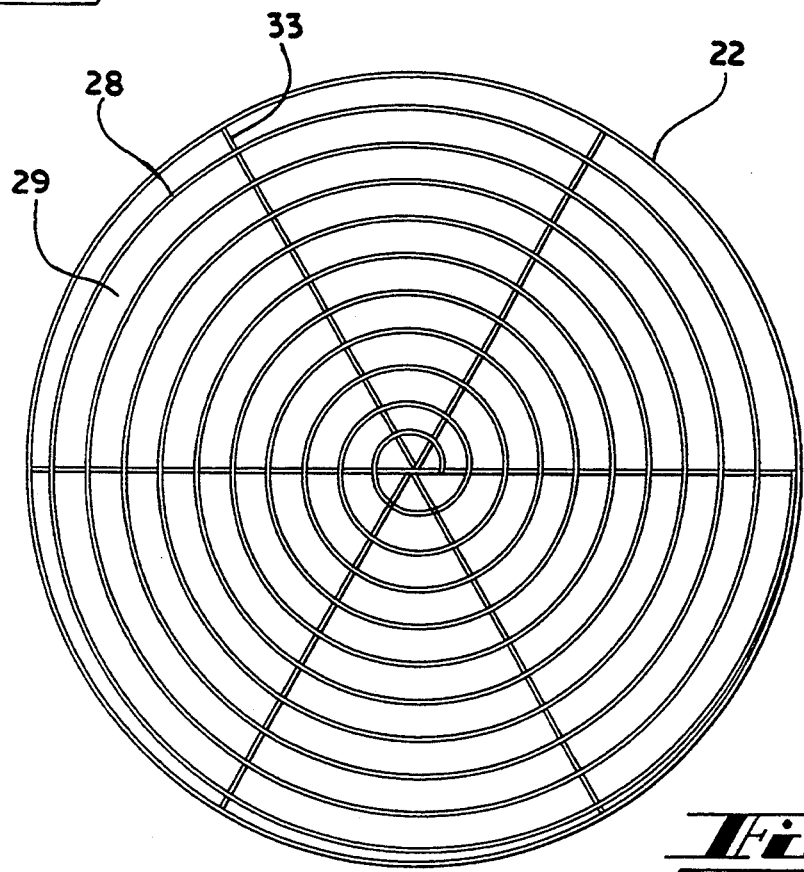
Fig_3

5,341,763

REMOVABLE SCREEN FOR ANIMAL LITTER BOX

FIELD OF THE INVENTION

This invention relates in general to animal litter boxes, and in particular to a screen for use in combination with litter boxes for removing waste products.

BACKGROUND OF INVENTION

Owners of small pets, such as cats and dogs, must provide a sanitary facility for use by the animal, if that animal spends any substantial amount of time indoor. These sanitary facilities are commonly known as litter boxes, and usually comprise an open-topped box for holding a quantity of disposable litter for use by the animal. This litter, as it is commonly known, may be one of the commercially-available processed granular mineral materials of the kind well known to cat owners in particular, or may comprise a naturally-occurring material such as sand or the like. The commercially-available processed animal litters usually are preferred by pet owners, because those litter materials are absorbent and are intended to clot with the absorbed urine so that the clots form solid clumps of waste products that are readily removable from the litter box. Commercial litter materials also frequently include a deodorizer for neutralizing offensive odors frown the litter box, thereby reducing the need for frequent cleaning of that box.

Cleaning an animal litter box, especially one used by cats, requires digging through the litter with a scoop or sifter to locate and remove solid waste products from the litter. Those waste products, including feces as well as clotted litter and urine, then are placed in a suitable bag or other waste container for disposal. This task is unpleasant and time-consuming, and requires some care to avoid spilling the granular material or the removed waste products onto the floor surrounding the litter box. Furthermore, the scoops or other implements used to extract the waste products from the litter need to be stored in some sanitary manner after each such use.

The prior art has recognized the problems associated with litter boxes. For example, U.S. Pat. No. 4,817,560 to Prince et al. discloses a litter box sifter in the form of a basket with a gridlike bottom and sides. This sifter basket is square or rectangular in shape, and fits within a litter box wherein the sifter basket conforms generally to the internal dimensions of the litter box. The sifter basket is lifted from the litter box to remove solid waste products from the litter box. According to that patent, the sifter basket is returned to the litter box by pressing the basket down into the box through the litter already in place within the box. However, it can be difficult to force the basket downwardly to the bottom of a closely-conforming box filled with litter, even when exerting substantial downward force on the basket.

Accordingly, it is an object of the present invention to provide an improved litter box.

It is another object of the present invention to provide an improved removable screen for use with a litter box.

It is a further object of the present invention to provide a litter box with a removable screen that fits within the litter box during normal use of the box and is relatively easily replaced in the litter box after withdrawing the screen to remove solid waste products.

It is a further object of the present invention to provide an animal litter box with a removable screen and a shield to cover portions of the litter box not containing the screen, so as to prevent unwanted ejection of litter material.

The foregoing and other objects of the present invention will become more readily apparent from the following discussion.

Stated in general terms, the present invention comprises a litter screen having a body of circular shape, such as a right circular cylinder or frustocone. This litter screen fits within a litter box that may be conventional in shape, and the litter screen has a perforated lower end placed adjacent the bottom of the litter box. The upper end of the litter screen body is open to allow an animal to enter and use the litter box. To clean the litter box, the litter screen is lifted upwardly from the litter box so that solid waste products are withdrawn from the litter box and remain within the litter screen on the perforated lower end while the granular litter material sifts through the perforated end to remain in the litter box. After disposing of the solid waste products thus removed from the litter box, the litter screen is returned to the litter box by placing the lower end of the screen on the litter in the box, and then thrusting downwardly the litter screen while oscillating the litter screen back and forth around its longitudinal axis. This oscillating movement significantly facilitates returning the litter screen to the bottom of the litter box, and the circular cross-section shape of the litter screen makes possible that movement within a litter box of conventional rectangular or square configuration.

Stated in somewhat more specific terms, the present litter screen has an imperforate body of generally circular cross-section and open at an upper end. The lower end of the litter screen body is covered by a screen member defining perforations sized to prevent passage of substantially all solid waste products anticipated within an animal litter box, but large enough to permit easy passage of the granular litter material commonly used in litter boxes. The structure defining that screen preferably is arcuate or curvilinear in configuration, so that the structure does not unnecessarily impede the oscillating movement while thrusting the litter screen into the litter material remaining in the litter box.

In a preferred embodiment of the present invention, the screen structure comprises a plane spiral member extending inwardly from the body to a point adjacent the center of the screen. Each adjacent flight of the spiral, as seen on a radial line extending from the center to the body, is spaced apart from adjacent flights a distance appropriate for the desired sifting action and retention of solid waste products.

BRIEF DESCRIPTION OF DRAWING

FIG. 1 is an exploded pictorial view, partly broken away for illustration, showing an animal litter box with removable screen according to a preferred embodiment of the invention.

FIG. 2 is a vertical section view showing in assembly the apparatus depicted in FIG. 1.

FIG. 3 is a bottom view of the screen structure in the preferred embodiment, as seen from the underside of the screen.

DETAILED DESCRIPTION OF PREFERRED EMBODIMENT

Turning first to FIG. 1, them is shown generally at 10 a litter box for receiving a litter screen 11. The apron 12 removably fits over the open upper end of the litter box, and the screen 11 fits through an opening 17 in the apron to enter the litter box. The litter box 10, which is generally rectangular in shape and has a liquid-impervious bottom 18 and side walls 19, may be of conventional shape and construction. It will become apparent that the litter box 10 alternately can be round or some other non-rectangular shape.

The litter screen 11 has an outer housing or body 22 generally circular in cross-section and cylindrical in shape. The body 11 thus defines an open upper end 23, and a lower end 24 covered by a screen element 25. This screen element 25 covers the entire lower end 24 of the body 22. The screen element in the preferred embodiment comprises a spiral coil 28, best seen in FIG. 3, having a single spiral rod extending in a flat plane from the outermost radial extent of the lower end 24 to terminate substantially at the center of the lower end. Alternatively, a screen element of concentric circular elements can be substituted for the spiral coil. The radial gap 29 between each adjacent turn of the spiral coil 28 is chosen so that little or none of the solid waste products expected in the litter box can fall between the spacing, while the granular litter 30 (FIG. 1) readily sifts through the spiral coil whenever the screen 11 is removed from or inserted into the litter box 10. By way of example, the radial gap between adjacent turns can be in the range of ⅜ inch to ½ inch, although those dimensions are not considered critical to the present invention. It is preferred that the gap spacing be as large as will prevent the solid waste products from passing through the screen, because the relatively wider gap spacing reduces resistance to burying the screen element in the litter as described below.

The spiral coil 28 in a preferred embodiment of the present invention is made of stainless steel for desired structural strength and resistance to rust or corrosion. The coil strands are ⅛ inch in diameter in that embodiment; thicker strands would make burying the screen element in the litter more difficult. The radial braces 33 are attached to the lower end 24 of the body 22 and extend across that lower end in close juxtaposition above the spiral coil 28, so as to provide structural support for maintaining the integrity of the spiral coil. One of the braces 33 in the disclosed embodiment is a solid rod extending across the diameter of the lower end 24, and the other braces am radial members joined to the center of the solid rod by welding or the like. The body 22 itself is made of stainless steel in the preferred embodiment. However, it should be understood that the litter screen 11 alternatively can be fabricated from suitable plastic materials, and that the use of a particular material such as stainless steel is not a limitation critical to the present invention.

The apron 12, as previously mentioned and as best seen in FIG. 2, rests on the open upper end of the litter box 10. An inwardly-turned flange 37 is formed at the lower edge of the outer side 38 on the apron, and that flange fits over the rim 39 (FIG. 1) at the upper end of the litter box 10. The upper surface 40 of the apron returns downwardly and inwardly from the top edge of the upper side 38, terminating in a circular rim that defines the opening 17 in the apron. As best seen in FIG. 2, the diameter of the opening 17 is somewhat greater than the adjacent dimension of the litter screen body 22, so that the litter screen 11 fits through the opening with some small distance to spare. The litter screen 11 preferably should occupy as much area within the litter box 10 as is practical, short of contacting the side walls 19 of the litter box, so as to maximize the surface area of litter available within the litter screen 11 for use by cats or other animals.

The operation of the present litter box and removable screen is now discussed. Assuming either a fresh start with a newly-acquired litter box 10 and screen 11, or a complete reloading of an existing litter box, a supply of litter 30 is poured into the litter box with the apron 12 either in place on the litter box as shown in FIG. 2, or removed while adding the litter. The litter screen 11 may be positioned at a central location in the litter box 10 at this time for convenience, and the litter 30 preferably is distributed in the litter box both within the litter screen 11 and in the surrounding areas of the litter box outside the screen. The dotted line 43, which is just below the upper rim 39 of the litter box as shown in FIG. 2 indicates the fill level of the litter 30.

With the desired amount of litter added to the litter box, the apron 12—if previously removed—now is placed on top of the litter box surrounding the litter screen 11 as shown in FIG. 2. The litter box now is ready for use by cats or other animals, who must step into the litter screen through the open upper end 23 for access to the litter 30 in the box. Cats instinctively try to bury their waste by scratching or digging in the litter, and the extent of the body 22 above the litter in the litter screen, will reduce the amount of litter ejected from the litter screen. Furthermore, the inwardly-sloped top surface 40 of the apron 12 should catch at least some of the litter ejected from body 22 of the litter screen. That ejected material thus slides down the inwardly-sloped top surface 40 and reenters the litter box 10.

The litter box is cleaned simply by lifting the litter screen 11 upwardly from the litter box. This can be accomplished without removing the apron 12, if desired. As the litter screen 11 moves upwardly through the litter 30, solid waste products are captured by the screen element 25 and remain within the litter screen. However, the remainder of the litter material 30 readily sifts downwardly through the radial spacing 29 of the screen element, returning that litter material to the litter box. Once the litter screen 11 is removed from the litter box, the litter screen can be carried to a suitable location for dumping the waste products removed from the litter box. The entire litter screen 11 can be cleaned at this time by spraying with a garden hose, if desired. The litter screen 11 then is returned to the litter box by placing the litter screen downwardly so that the lower end 24 and the screen element 25 engage the upper surface of the litter 30 remaining the litter box. By thrusting downwardly on the upper end 23 of the litter screen, while simultaneously twisting or oscillating the litter screen around the vertical axis of the body 22, the litter screen is readily displaced downwardly through the granular litter 30 in the litter box. The spiral coil 28 making up the screen element 25 provides minimum resistance to this twisting or back-and-forth movement of the litter screen 11 while the litter screen is being pressed downwardly into the litter box 10. The radial braces 33, being located on the inside of the spiral coil 28, provides relatively low resistance to oscillation of the litter screen while giving axial support to the spiral coil during the thrusting motion. The upper edge of the body 22 preferably is rounded as shown at 44 to protect the hands of a person pushing the litter screen downwardly into the litter 30. With the litter screen 11 fully returned to the litter box so that the lower end 24 of the litter screen is adjacent to the bottom 18 of the litter box, the apparatus is ready for further use.

The present apparatus helps reduce the dust previously associated with handling the typical animal litter. When the litter screen 11 is removed from the litter box 10, the apron 12 on the box helps contain the dust produced as the litter sifts through the screen element 25 and returns to the box. The presence of the apron on the box also confines the dust stirred up when the litter screen is being reinserted into the litter in the box. Furthermore, the relative ease of removing the present litter screen from the litter box and then returning the litter screen to the box shortens the time required for cleaning the litter box.

Although the body 22 of the litter screen 11 in the preferred embodiment is in the shape of a right circular cylinder, it should be understood that other cylindrical shapes of the body are contemplated within the scope of the present invention so long as such alternative shape does not unduly impede insertion of the litter screen into the litter box. For example, a body in the shape of a hollow truncated cone is one alternative to the right circular cylindrical body 22 of the preferred embodiment.

It should be understood that the foregoing relates only to a preferred embodiment of the present invention, and that numerous changes and modifications thereto may be made without departing from the spirit and scope of the invention as defined in the following claims.

What is claimed is:

1. An animal litter box with a litter screen, comprising in combination:
   a box having a liquid-impervious bottom and sides effective to receive and contain a quantity of animal litter; and
   a litter screen removably disposed in the box;
   the litter screen having a hollow cylindrical body with a longitudinal axis;
   the body having an open upper end to allow an animal to enter the hollow body and use the litter box; and
   the litter screen having a lower end associated with the body and comprising a plurality of curvilinear turns concentric with the longitudinal axis;
   the radial gap between adjacent concentric turns being sized to sift solid waste products from the litter and retain those waste products within the litter screen while the litter flows through the gaps as the litter screen is lifted from the box,
   whereby the litter screen, after the retained waste products are discarded, can be returned to the box by placing the lower end on the litter in the box and thrusting downwardly on the body while oscillating the litter screen around the longitudinal axis of the body.

2. A litter screen for use with an animal litter box of determinate interior dimension, the litter screen comprising:
   a hollow body having a longitudinal axis and being substantially circular in cross-section perpendicular to the longitudinal axis;
   the diameter of the body not exceeding the corresponding interior dimension of a litter box in which the screen is used, so that the body can be disposed with the longitudinal axis upright within the litter box;
   the litter screen having a lower end associated with the body for placement adjacent the bottom of the litter box and comprising a plurality of curvilinear turns concentric with the longitudinal axis, with radial gap between adjacent concentric turns being sized to sift solid waste products from the litter and return those waste products within the litter screen while the litter in the box flows through the gaps; and
   the body having an upper end open to allow an animal to enter the hollow body and use the litter box from within the litter screen
   whereby the litter screen, after the removed waste products are discarded, can be returned to the litter box by placing the lower end against the litter in the litter box and pressing downwardly on the upper end of the body while oscillating the body around the longitudinal axis.

3. An animal litter box with a litter screen, comprising in combination:
   a box having a liquid-impervious bottom and sides effective to receive and contain a quantity of animal litter; and
   a litter screen removably disposed in the box;
   the litter screen having a hollow cylindrical body;
   the body having an open upper end to allow an animal to enter the hollow body and use the litter box; and
   the litter screen having a lower end associated with the body and comprising a plane spiral member extending inwardly from the body to a point adjacent the center of the lower end; and
   the spacing between adjacent turns of the spiral member is sized to retain the solid waste products in the litter screen and to allow the litter to flow substantially unimpeded through the spiral member as the litter screen is removed from the box, so as to sift solid waste products from the litter and retain those waste products within the litter screen while the litter flows through the spiral member as the litter screen is lifted from the box,
   whereby the litter screen, after the retained waste products are discarded, can be returned to the box by placing the lower end on the litter in the box and thrusting downwardly on the body while oscillating the litter screen around the vertical axis of the body.

4. An animal litter box with a litter screen, comprising in combination:
   a box having a liquid-impervious bottom and sides effective to receive and contain a quantity of animal litter; and
   a litter screen removably disposed in the box;
   the litter screen having a hollow cylindrical body;
   the body having an open upper end to allow an animal to enter the hollow body and use the litter box;
   a skirt disposed on the box and having a surface extending inwardly from the sides of the box to define a central opening for receiving the litter screen, so that the skirt can catch litter scratched from within the litter screen by animals using the litter box; and
   the litter screen having a perforated lower end associated with the body;
   the perforated lower end being operative to sift solid waste products from the litter and retain those waste products within the litter screen while the litter flows through the perforated lower end as the litter screen is lifted from the box, whereby the litter screen, after the retained waste products are discarded, can be returned to the box by placing the lower end on the litter in the box and thrusting downwardly on the body while oscillating the litter screen around the vertical axis of the body.

5. Apparatus a in claim 4, wherein:

the surface of the skirt slopes downwardly from the sides of the box toward the central opening, so that the litter scratched onto the skirt tends to re-enter the box.

* * * * *